Patented Jan. 10, 1939

2,143,326

UNITED STATES PATENT OFFICE

2,143,326

MATTING PROCESS

Albert Landolt, Riehen, and Gustave Widmer and Hans Benz, Basel, Switzerland, assignors to the firm Society of Chemical Industry in Basle, Basel, Switzerland No Drawing. Application July 13, 1937, Serial No. 153,445. In Germany December 16, 1936

2 Claims. (Cl. 260—68)

In U. S. application Serial No. 64,796 filed February 19, 1936, there has been described a process for matting textiles which consists in treating textiles in such matting baths which contain condensation products insoluble in water obtainable from compounds of the urea group and formaldehyde in colloidal state. A variation of carrying out this process consists in first producing condensation products insoluble in water which are then dissolved in acids, for example formic acid. By diluting this solution with water there is obtained the matting liquor.

The condensation products insoluble in water are readily to sparingly soluble in formic acid according to their method of production. For the sparingly soluble condensation products more energetic conditions for the dissolution must be chosen, for example, longer reaction, higher temperature, great excess of acid in high concentration. The condensation products insoluble in water may thereby undergo such changes, probably due to hydrolizing processes, that the treatment baths obtained by subsequent dilution with water are less suitable for matting. In order to carry out the matting process of the said patent application as economically as possible it is therefore necessary to effect the dissolution of the condensation products insoluble in water obtainable from compounds of the urea group and formaldehyde under as much as possible preserving conditions, for example by avoiding too high a temperature or too long a duration of the reaction.

It has now been found that the condensation products insoluble in water obtainable from compounds of the urea group and formaldehyde dissolve in acids under essentially milder conditions if they have been subjected to a water treatment previous to the dissolution. Swelling takes place thereby, probably combined with a hydration of the condensates which facilitates the subsequent dissolution with acids. This makes it possible to dissolve the condensation products in acids under essentially milder conditions as mentioned above (particularly with regard to the temperature and the duration of the reaction), so that excellent yields in the matting effect are obtained. The process is capable of quite general application and may be applied generally to all condensation products cited in the patent application referred to above.

The following examples illustrate the invention:—

Example 1

1 liter of water is poured onto 1 kilogramme of a condensation product from formaldehyde and urea in a finely powdered state, produced as indicated below, the whole is carefully stirred and allowed to stand overnight.

The swelled product is stirred the following day with a second liter of water and mixed with 4 liters of formic acid. The mixture is then allowed to stand for 20 minutes at 20° C., whereupon the clear solution is poured into a matting bath consisting of 600 liters of water of 35° C. and 300 grams of common salt. 20 kilogrammes of viscose artificial silk yarn are now introduced into the feebly opalescent liquor, handled for 30–40 minutes and rinsed with fresh water after the matting liquor has been exhausted.

The condensation product from formaldehyde and urea has been made as follows:—1 gram molecule of urea is dissolved in 2 gram molecules of aqueous formaldehyde. The solution is then neutralized and heated in a closed vessel for 6 to 8 hours at about 100° C. The slightly viscous water soluble urea-formaldehyde condensation product thus obtained is dried under a high vacuum at low temperature, coarsely ground, and heated for 4 hours at 120° C. The sintered mass thus obtained is finely ground and hardened for 1 hour at 100° C.

In connection with the method of manipulation, reference is made to the following directions:—

If dissolution of the swelled product has been effected in formic acid at 30° C., it is advantageous to add the solution already after 10 minutes to the matting bath. In winter, if for example the dissolution in formic acid has taken place at 10° C., it is expedient to add the solution only after 1 hour to the matting bath.

It can be gathered from these data that for the production of optimum matting effects the action of the formic acid on the formaldehyde-urea condensation product must be taken into consideration. If urea-formaldehyde condensation products are used which have been produced in another manner, the most favorable conditions of solubility must be ascertained individually by experiments. For this purpose a rapid dissolution of the condensation products according to the present process is however of advantage.

Example 2

The slightly viscous condensation product obtained as described in the third paragraph of Example 1 is hardened for 4 hours at 130° C. The product insoluble in water is then stirred to a fine paste with 2 parts by weight of water and allowed to stand for some time.

1.5 parts by weight of this paste are stirred when cold with 2 parts by volume of formic acid of 85 per cent. strength, and the whole is allowed to stand for 13 minutes. The solution thus obtained is poured into 300 parts of water of condensation of 35–40° C. containing 0.15 part by weight of common salt. There is formed a white opalescent colloidal solution. 10 parts by weight of a skein of viscose artificial silk dyed for 45 minutes at 90° C. with 4 per cent. of Cupranil Brown B (Colour Index No. 560) with addition of 30 per cent. of Glauber's salt, are handled in the matting liquor for 30 minutes. There is obtained a good matting fast to washing which does not affect the shade. A similar result is also obtained with artificial silk dyed navy blue with 4 per cent. of Melantherine BH (Colour Index No. 401).

*Example 3*

1.5 parts by weight of the paste of Example 2 are dissolved when cold in formic acid and shortly afterwards poured into 300 parts of water of condensation of 35–40° C. containing 0.15 part by weight of common salt. 10 parts by weight of a skein of viscose artificial silk dyed for 45 minutes at 90° C. with 6 per cent. of Artificial Silk Black GN (Colour Index, page 341, 3rd column) and 30 per cent. of Glauber's salt are handled in the freshly prepared colloidal solution for about 30 minutes. After rinsing the artificial silk is soaped for 15 minutes at 30° C. in a bath containing per liter 2 grams of soap and 1 cc. of olive oil. A good matting fast to washing is obtained. Due to soaping a very deep bloomy black is obtained.

*Example 4*

1 kilogramme of a condensation product from urea-thioureau and formaldehyde, produced as indicated below, is finely ground and allowed to stand overnight with 1 liter of water. The swelled product is again stirred the following day with 1 liter of water and then mixed at 70° C. with 4 kilogrammes of formic acid of 85 per cent. strength. The product dissolves very quickly at this temperature. The whole is then allowed to stand for 10 minutes. A matting bath is then produced by diluting the solution with 600 liters of water of 40° C. to which 1800 grams of common salt are added. 20 kilogrammes of viscose artificial silk yarn are introduced into the feebly opalescent liquor, handled for 30–40 minutes and rinsed with fresh water. The artificial silk has acquired a very strong matting.

The condensation product from urea-thiourea and formaldehyde has been made as follows:—1 gram molecule of urea is dissolved in 2 gram molecules of aqueous formaldehyde. The solution is then neutralized and heated in a closed vessel for 6 to 8 hours at about 100° C. The slightly viscous water soluble urea-formaldehyde condensation product thus obtained is dried under a high vacuum at low temperature.

12.5 parts of this product are mixed with 2.5 parts of thio-urea and dissolved in 15 parts of water. This solution is heated for 4 hours on sheet aluminium at 130° C. and the foaming product which is insoluble in water is ground.

What we claim is:—

1. In the process for the production of matting baths which consists in dissolving condensation products insoluble in water obtainable from formaldehyde and urea compounds in formic acid, and diluting these solutions with water to matting baths, the step which consists in treating the insoluble ground condensation products, previous to the dissolution in formic acid, with water until the condensation products are swelled.

2. In the process for the production of matting baths which consists in dissolving condensation products insoluble in water obtainable from formaldehyde and urea in formic acid, and diluting these solutions with water to matting baths, the step which consists in treating the insoluble ground condensation products, previous to the dissolution in formic acid, with water until the condensation products are swelled.

ALBERT LANDOLT.
GUSTAVE WIDMER.
HANS BENZ.